(12) United States Patent
Shipman

(10) Patent No.: US 7,883,400 B2
(45) Date of Patent: Feb. 8, 2011

(54) PIN BONE REMOVAL APPARATUS

(75) Inventor: Gregory Kenneth Shipman, Fairbanks, AK (US)

(73) Assignee: University of Alaska, Fairbanks, AK (US)

( * ) Notice: Subject to any disclaimer, the term of this patent is extended or adjusted under 35 U.S.C. 154(b) by 1119 days.

(21) Appl. No.: 11/560,729

(22) Filed: Nov. 16, 2006

(65) Prior Publication Data

US 2007/0123156 A1    May 31, 2007

Related U.S. Application Data

(60) Provisional application No. 60/737,260, filed on Nov. 16, 2005.

(51) Int. Cl.
*A22C 17/00* (2006.01)

(52) U.S. Cl. ..................................... 452/138

(58) Field of Classification Search ................. 452/135, 452/138
See application file for complete search history.

(56) References Cited

U.S. PATENT DOCUMENTS 4,930,189 A * 6/1990 Woodland .................. 452/138
5,176,562 A   1/1993 Martin et al.
5,547,420 A * 8/1996 Stikeleather et al. ........ 452/138
5,713,787 A   2/1998 Schoenmakers et al.
6,406,366 B1 * 6/2002 Kozycki ..................... 452/135

FOREIGN PATENT DOCUMENTS

WO    WO 2007/059531    5/2007

* cited by examiner

*Primary Examiner*—Thomas Price
(74) *Attorney, Agent, or Firm*—Ballard Spahr LLP

(57) ABSTRACT

A pin bone removal device that provides a plurality of fixed members arranged substantially in side-by-side orientation. The invention also comprises a plurality of moveable members also substantially arranged in a side-by-side orientation. In one aspect, the fixed members and moveable members collectively form a stack of members in which a moveable member is positioned adjacent each fixed member. In this aspect, a linear drive is operatively connected to each of the moveable members and is configured to cause oscillating movement of each moveable member to cause the moveable members to contact the adjacent fixed member. This movement causes pinch points to be created and released between the fixed and moveable members. As the fillet of fish is moved along the stack of members, the pin bones are caught at each pinch point and then released.

21 Claims, 12 Drawing Sheets

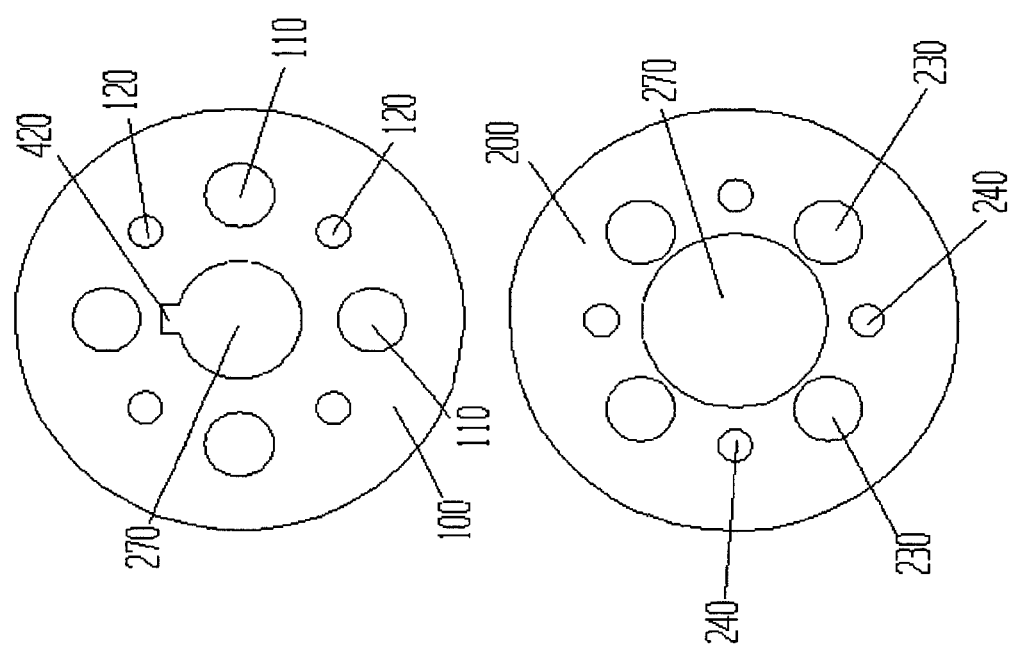

PIN BONE REMOVAL APPARATUS

PRIORITY INFORMATION

This application claims the benefit of and priority to U.S. Application No. 60/737260, filed on Nov. 16, 2005, which is incorporated herein in its entirety by reference.

FIELD OF THE INVENTION

The present invention relates to a device and method for removing bones from a fish and, more specifically, for removing pin bones from a fillet of salmon, pollack, mackerel, trout, whitefish, haddock, scrod, and the like.

BACKGROUND OF THE INVENTION

Fish possess a skeletal structure that has a vertebral column or back bone from which spines extend upwardly (dorsal spines) and downwardly (ventral spines). No ventral spines are located in the region of the fish's belly cavity, however. Vertebrae extend over the top of the belly cavity for a short distance on either side of the mid-line, from which rib bones depend and curve downwardly to enclose the belly. Pin bones extend horizontally from the rib bones and terminate at or near the skin. For example, there are typically about forty pin bones in salmon.

The conventional method of filleting fish, by hand or machine, is to cut through the fish following the line of the bones from the dorsal to ventral fins and to pass over the rib bones, which severs the connections between the pin bones and the rib bones. In this method, a line of pin bones remains in the fillet.

There are two common methods used to remove the pin bones that remain in the fillet. In a first method, the pin bones are cut out of the fillet. For this method, filleting machines exist in the prior art that can produce bone-free fish fillets, but the yield is substantially lowered since the whole belly flap is cut off to ensure complete removal of the pin bones. The flesh of the belly flap can be recovered in a minced form after its passage through a bone separating device. However, since salmon and other fish are expensive, removal of the pin bones without extracting substantial quantities of meat is desired.

In a second method for removal of the remaining pin bones, the pin bones are pulled out of the fillet. In the oldest technique, the pin bones are pulled using a gripping tool, such as pliers. However, this option is time-consuming and labor-intensive, which results in higher cost to the consumer and potential injuries to the workers, such as, for example, carpal tunnel syndrome.

U.S. Pat. No. 4,771,511 to Weyand discloses a tool to simultaneously remove multiple pin bones, instead of individually pulling the pin bones out. The disclosed device includes a pair of opposed plates attached to forceps. The plates are configured to allow the device to remove more than one pin bone at a time. However, this technique still relies on manual labor and, thus, suffers from the disadvantages discussed above.

U.S. Pat. No. 4,945,607 to Akesson, et al. discloses a pair of jaws used in another prior art technique. Here, one of the jaws is fixedly positioned and the second jaw is pivoted relative to the first jaw by a pneumatically-operated cylinder between an opened position and a closed position. When the pin bone is positioned between the jaws in the opened position, the cylinder moves the second jaw to the closed position, which grasps the pin bone so that the pin bone may be pulled out of the fillet. This device, however, is bulky and difficult to align with the pin bones.

Still another prior art device is a rotatable cylinder having a plurality of holes for receiving fish bones. In use, when the operator moves the rotating cylinder across the surface of a fish fillet, pin bones are caught in the holes in the cylinder. To ensure that the bones are held to the hole and pulled from the fillet, a tongue or lip moves to grip the pin bone against the edge of the hole. After the pin bone is removed and as the cylinder spins away from the fillet, the tongue separates from the edge of the hole to release the pin bone. A vacuum suction device conveys the bone away from the cylinder and into a collecting receptacle. U.S. Pat. No. 5,525,101 to Soderlind discloses an embodiment of this design.

This rotatable cylinder design has drawbacks. One problem is that when the operator moves the cylinder across the fillet, it obscures the area where the bones are picked up. Consequently, the pin bones are easily flattened so that the cylinder does not catch the bones, hindering the operator from removing all the bones and requiring the operator to repeat the process. Another potential problem is that the operator pressing the rotating cylinder against the fillet may potentially remove meat from the fillet and create a less appealing appearance. Additionally, the removed pin bones may become stuck in the cylinder holes used to remove the pin bones, which may eventually require an interruption in operation to clean the cylinder. In conjunction, thoroughly cleaning the device can be time-consuming and cumbersome. Cost is another drawback of the rotating cylinder design.

Another device, as described in U.S. Pat. No. 6,123,614 to Kozycki, uses a plurality of spring-tempered sheet metal disks that are assembled to form a stack of disks aligned so that the peripheries form at least one "pinch-point," at which the periphery of two disks contact each other, to grip a pin bone. In operation, the stack of the disks is rotated and moved over the fillet and the pin bone is disposed between two adjacent rotating disks. As the gap between the disks closes to the pinch-point, the pin bone becomes wedged and is subsequently plucked out of the fillet as the wedged pin bone is pulled by the rotating disks. One problem with this design is that the pin bones may get lodged in the gaps of the disks and have to be manually removed.

Therefore, a need exists in the art for a relatively inexpensive device to remove pin bones from fish. It is desired that the device can be used in an automated process, instead of having an operator who removes the bones by manually maneuvering a machine or remove pin bones. Still another need in the art is for a device that reliably extracts the pin bones without removing a significant amount of meat from the fillet, creating an unattractive surface appearance, or otherwise damaging the fillet.

SUMMARY

In one aspect, the present invention is directed to a pin bone removal device that provides a plurality of fixed members arranged substantially in side-by-side orientation to form an array of fixed members. The invention also comprises a plurality of moveable members that are configured in a substantially side-by-side orientation to form an array of moveable members. In one aspect, respective arrays of the fixed members and moveable members collectively form a stack of members in which a moveable member is positioned adjacent each fixed member. In this aspect, a linear drive is operatively connected to each of the moveable members and is configured to cause an oscillating movement of each moveable member along a substantially linear path to cause the moveable members to contact the adjacent fixed member. This oscillating movement causes pinch points to be created and released between the respective fixed and moveable members. In operation, as the fillet of fish is moved along the rotating and oscillating stack of members, the pin bones are caught at each pinch point, removed from the fish and are then released. As can be appreciated by those skilled in the art, it is contemplated that the fixed members and the moveable members may comprise aluminum, stainless steel, plastic, or any other sufficiently rigid material.

In another aspect, a moveable member can be positioned between each fixed member to collectively form the stack of members. In this aspect, the linear drive is configured to cause oscillating movement of each of the moveable members to contact the fixed members on either side of each moveable member in an alternating fashion.

DETAILED DESCRIPTION OF THE DRAWINGS

These and other features of the preferred embodiments of the present invention will become more apparent in the detailed description, in which reference is made to the appended drawings wherein:

FIG. 12 is an elevational view of exemplary fixed and moveable members.

DETAILED DESCRIPTION OF THE INVENTION

Figure 1:
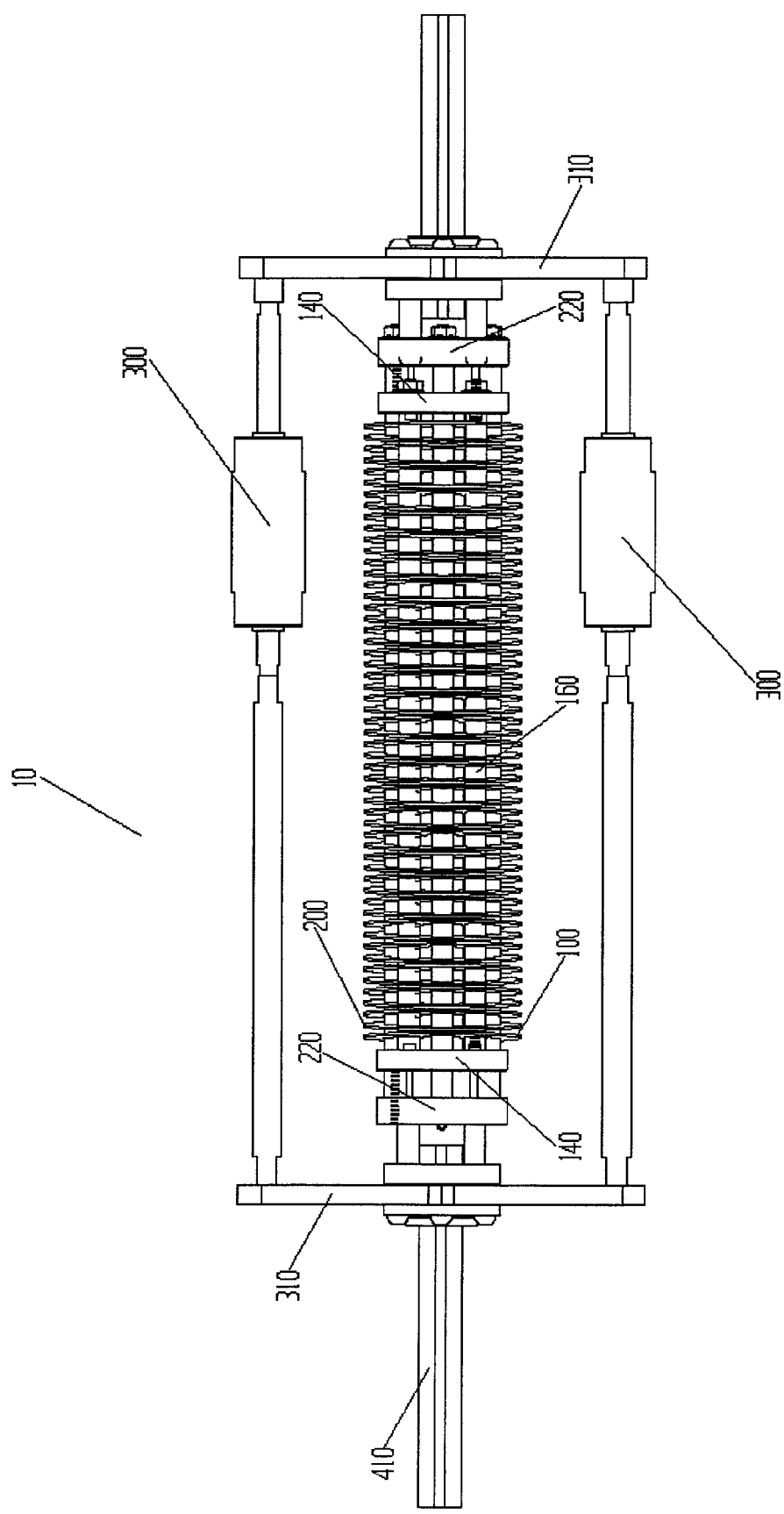
FIG. 1 is a top elevational view of one embodiment of a pin bone removal device of the present invention, showing a stack of members that comprises a plurality of movable members and a plurality of fixed members that are configured to operatively cooperate to form pinch points between respective moveable and fixed members.
Figure 2:
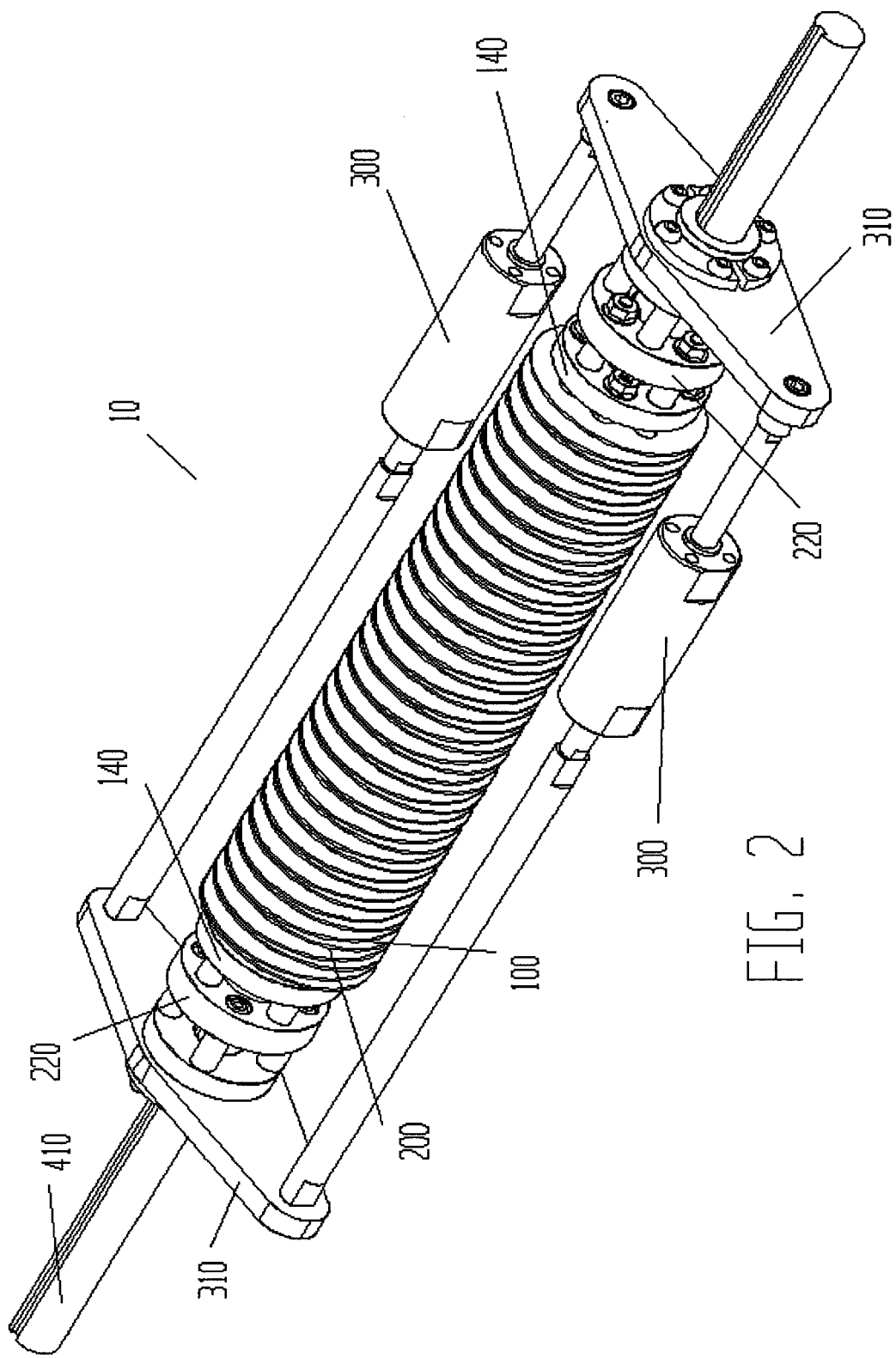
FIG. 2 is a perspective view of a shuttle assembly of the pin bone removal device of FIG. 1, showing a plurality of the movable members configured to oscillate along a substantially linear path substantially parallel to the longitudinal axis of the pin removal device.
Figure 3:
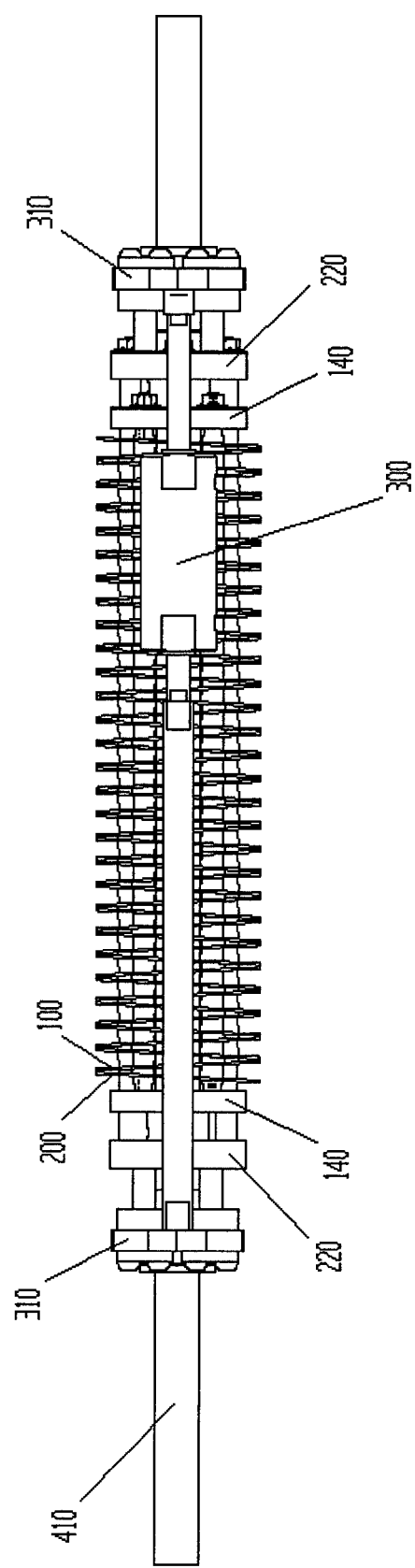
FIG. 3 is a side elevational view of the pin bone removal device of FIG. 1.
Figure 4:
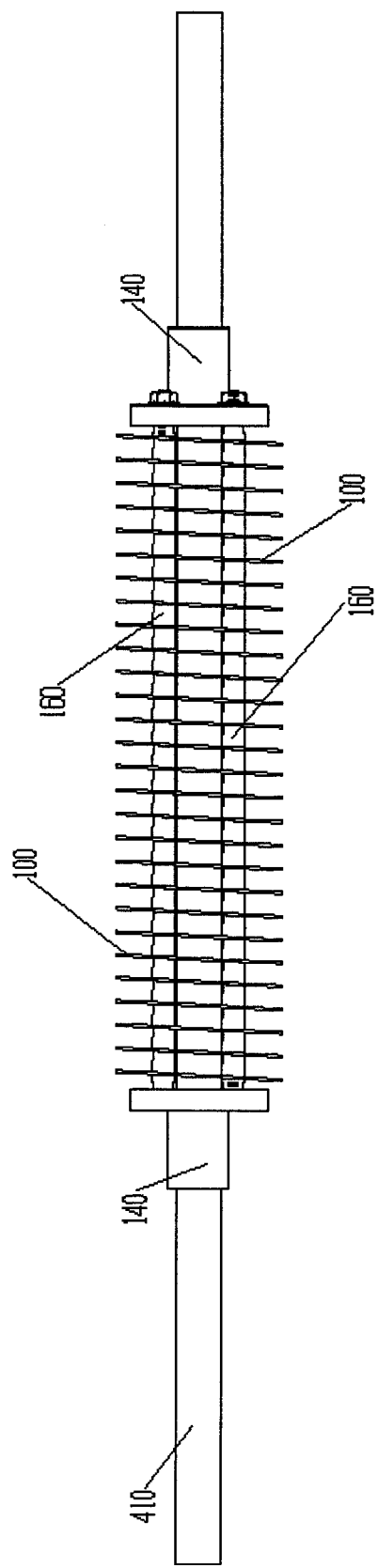
FIG. 4 is a side elevational view of a fixed member assembly, showing a plurality of fixed members that are exemplary angled with respect to the longitudinal axis of the fixed member assembly and the longitudinal axis of the pin bone removal device.
Figure 5:
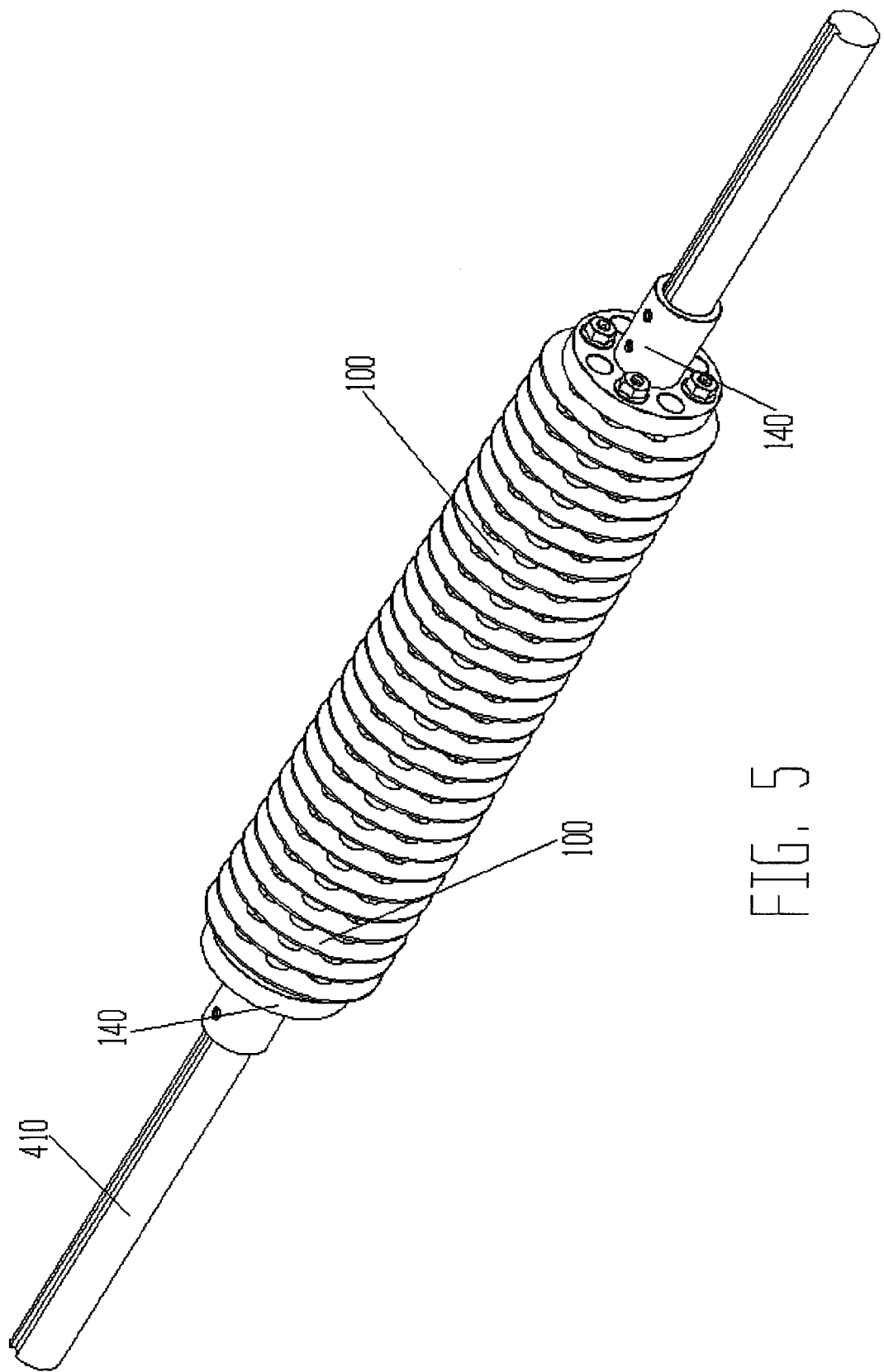
FIG. 5 is a perspective view of the fixed member assembly of the fixed member assembly of FIG. 4.
Figure 6:
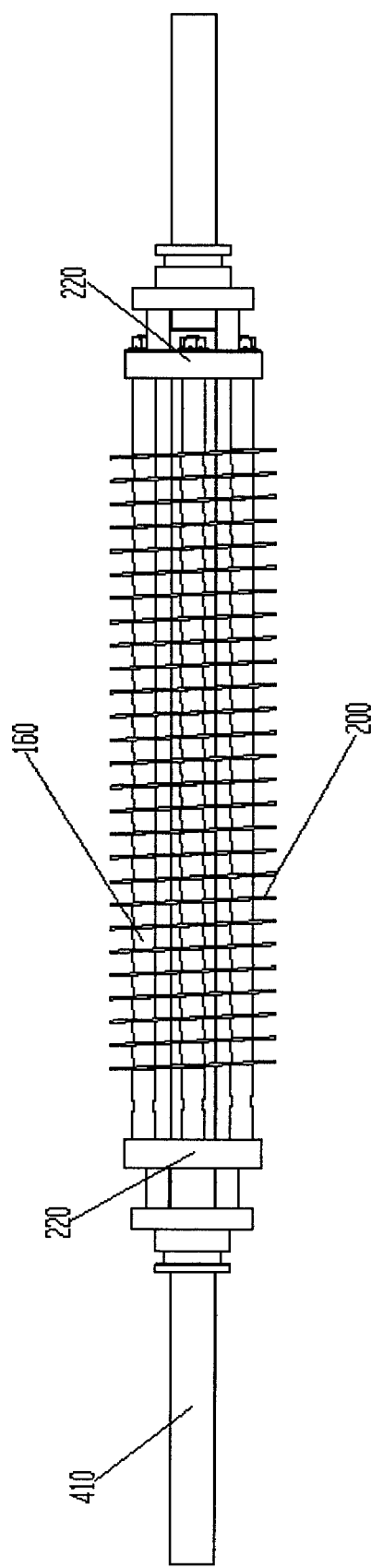
FIG. 6 is a side elevational view of a moveable member assembly, showing a plurality of moveable members that are exemplary angled with resped to the longitudinal axis of the moveable member assembly and the longitudinal axis of the pin bone removal device.
Figure 7:
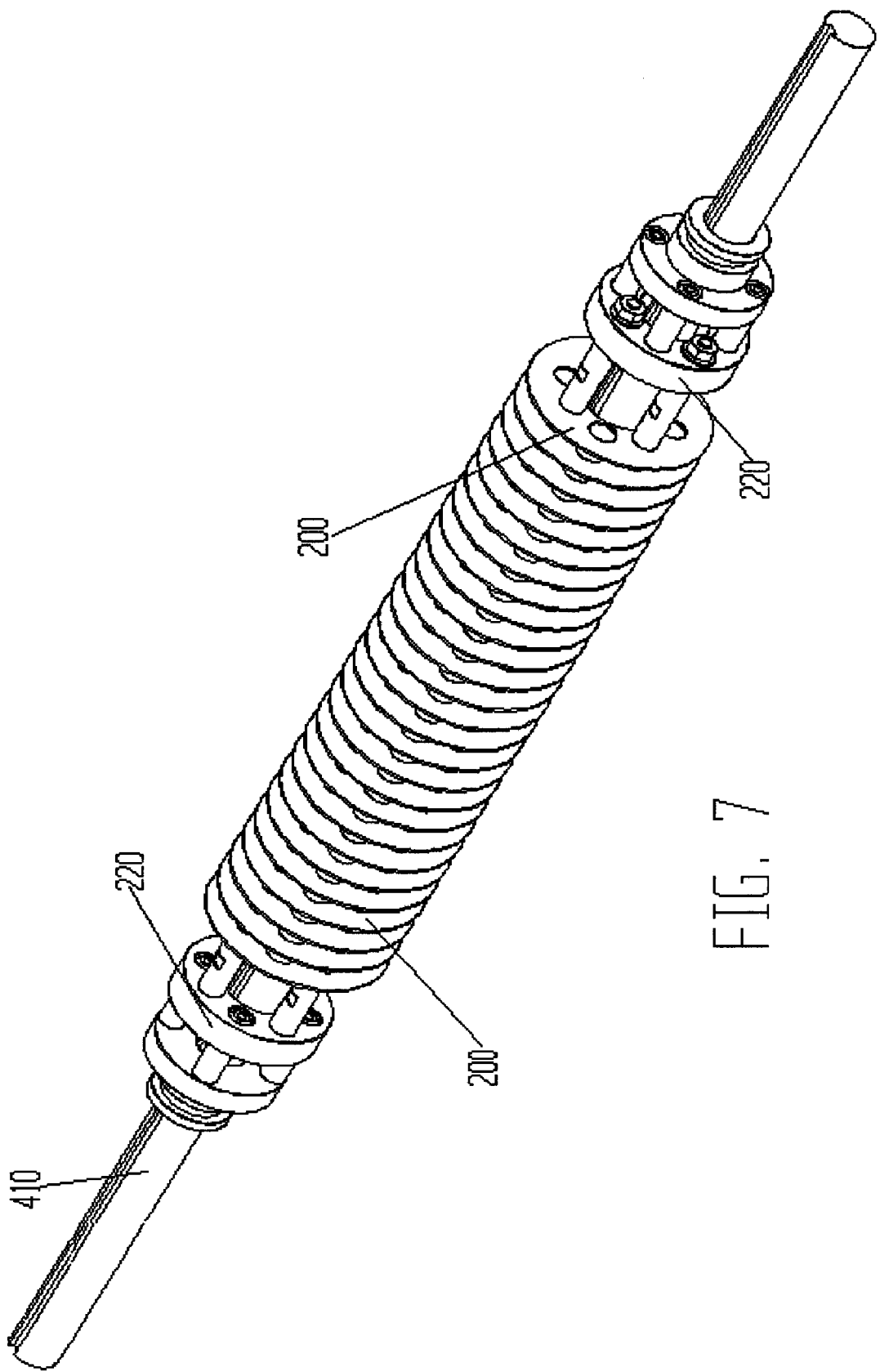
FIG. 7 is a perspective view of the moveable member assembly of FIG. 6.
Figure 8:
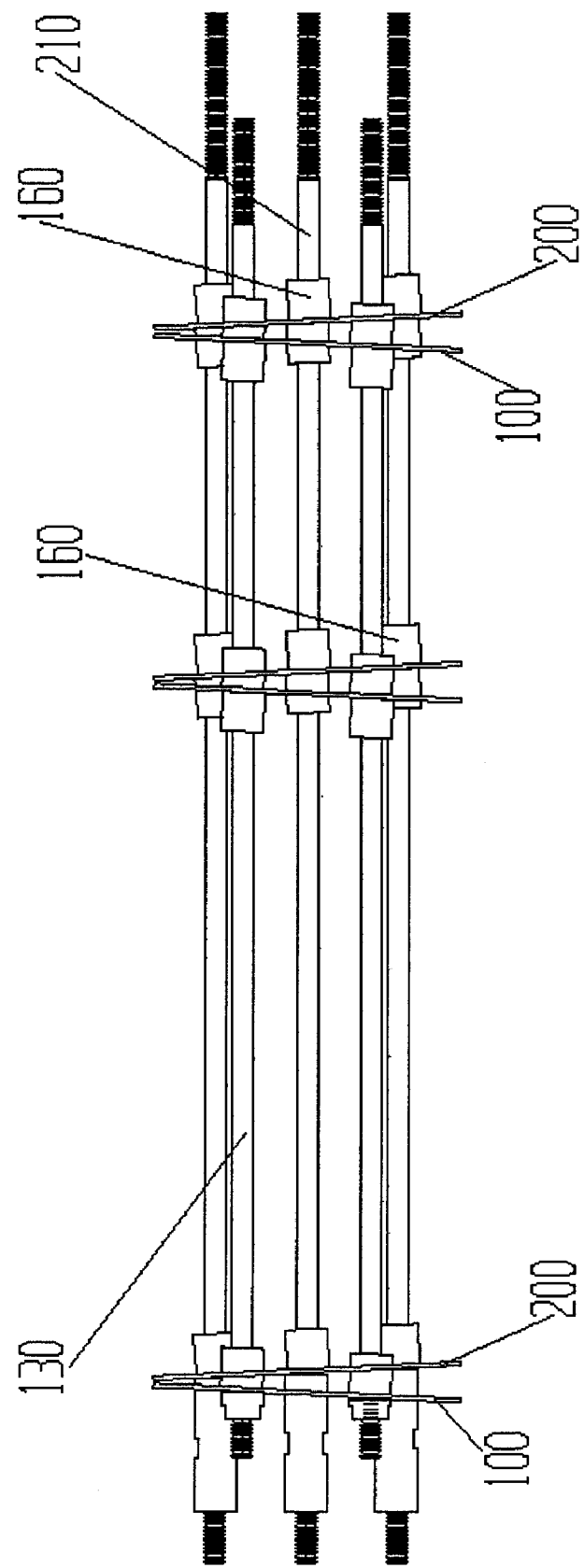
FIG. 8 is a partial side elevational view of the fixed member assembly and the shuttle assembly, showing three cooperatively configured pairs of respective moveable and fixed members, and showing each of the respective moveable and fixed members being angled with respect to the longitudinal axis of the pin bone removal device.
Figure 9:
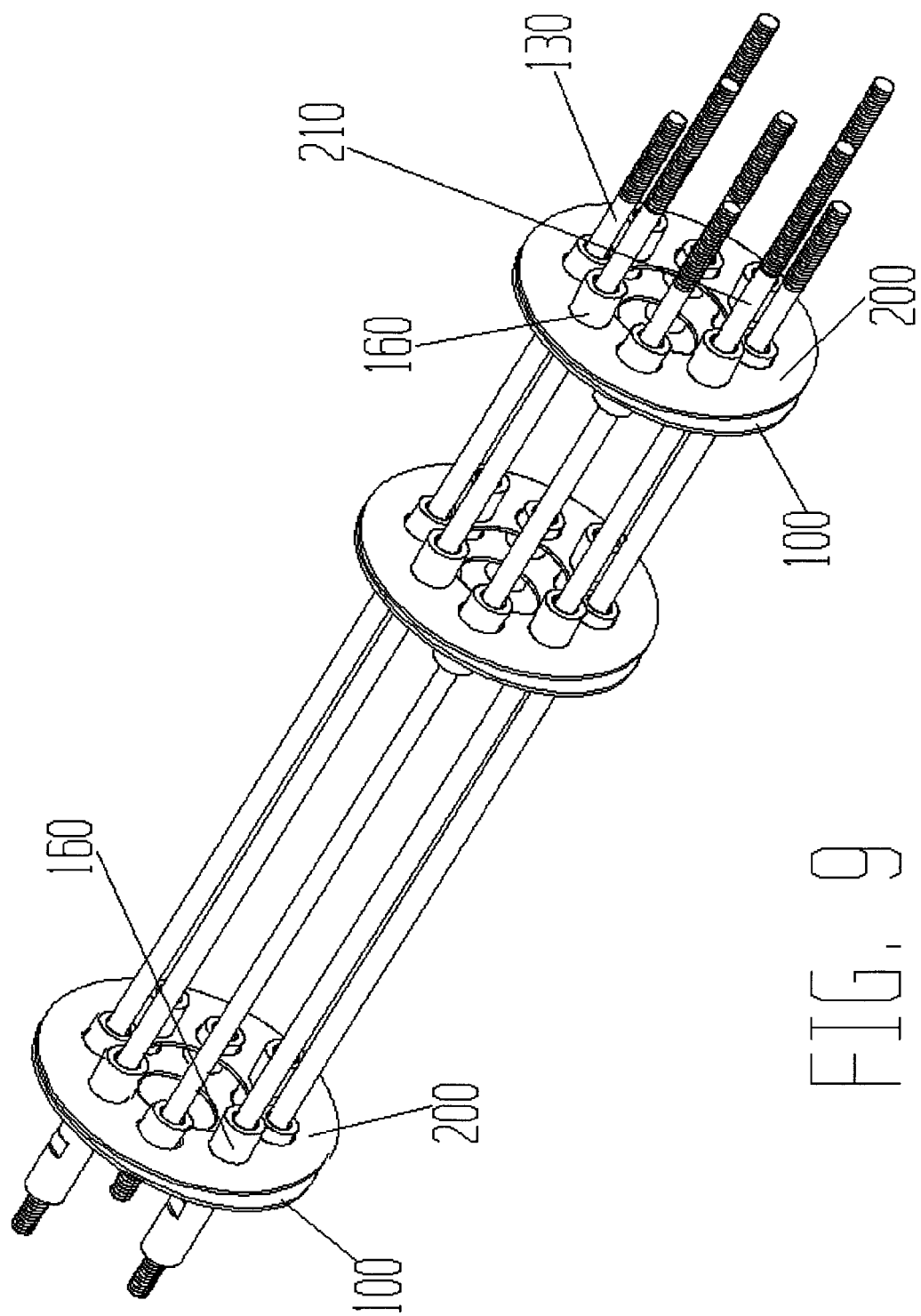
FIG. 9 is a partial perspective view of the fixed member assembly and the shuttle assembly of FIG. 8.
Figure 10:
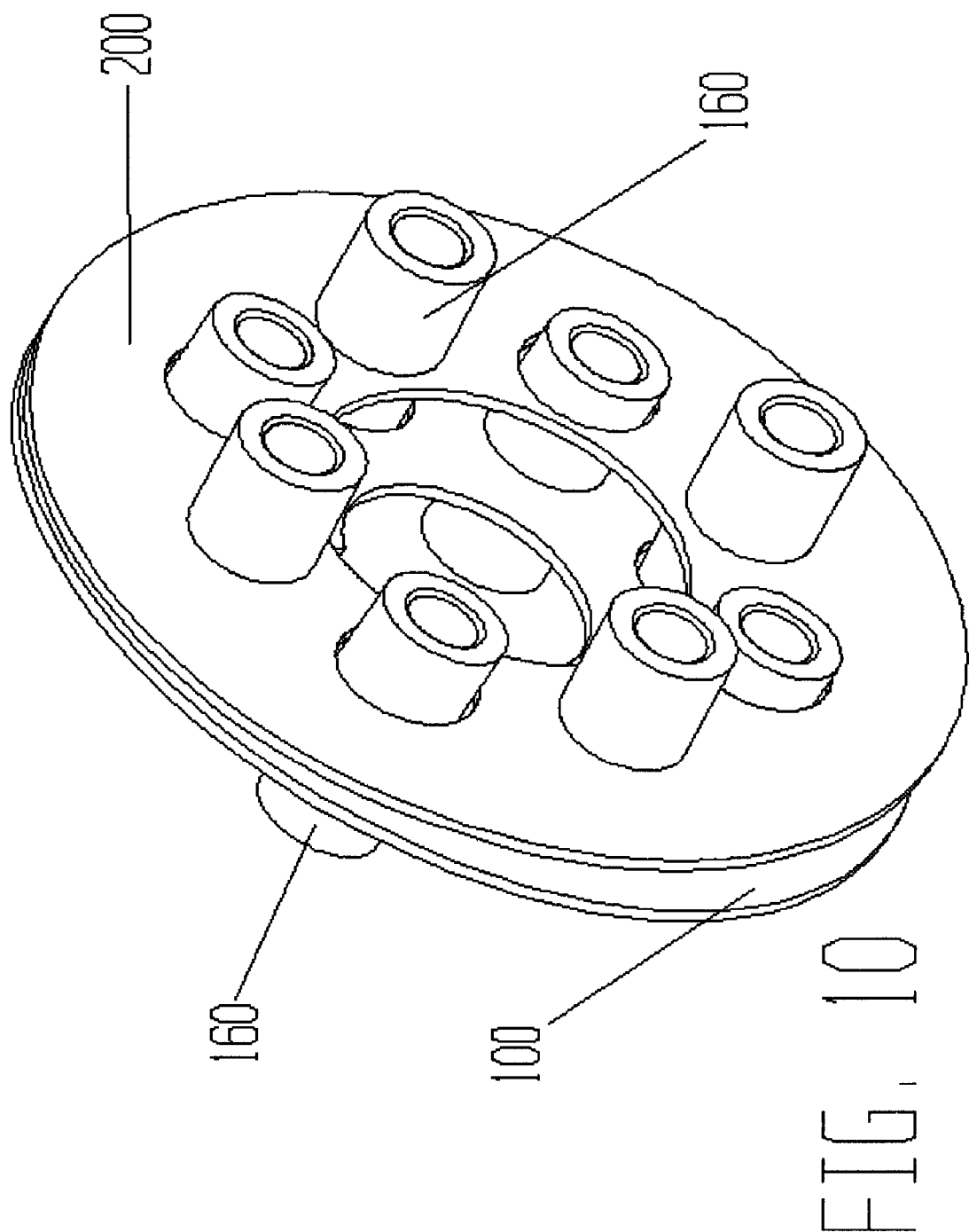
FIG. 10 is a perspective view of a fixed and moveable member showing a plurality of spacer members.
Figure 11:
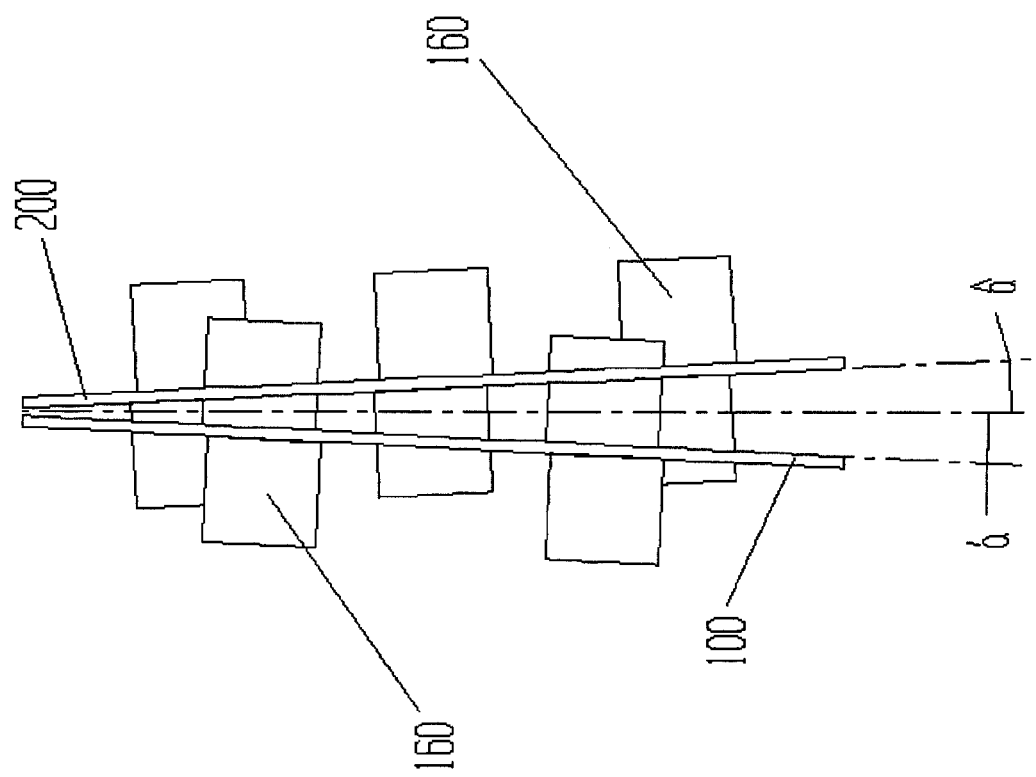
FIG. 11 is a side elevational view of the fixed and moveable members of FIG. 10, showing angles α and β.

The present invention is more particularly described in the following exemplary embodiments that are intended as illustrative only since numerous modifications and variations therein will be apparent to those skilled in the art. As used herein, "a," "an," or "the" can mean one or more, depending upon the context in which it is used. The preferred embodiments are now described with reference to the figures, in which like reference characters indicate like parts throughout the several views.

Ranges may be expressed herein as from "about" one particular value, and/or to "about" another particular value. When such a range is expressed, an alternate embodiment includes from the one particular value and/or to the other particular value. Similarly, when values are expressed as approximations, by use of the antecedent "about," it will be understood that the particular value forms another embodiment.

Referring to the figures, the present invention is a pin bone removal device 10 that provides a fixed member assembly comprising plurality of fixed members 100 that are, in one aspect, arranged substantially in a parallel side-by-side orientation to form an array of fixed members. The invention also comprises a stack assembly comprising a plurality of moveable members 200 that are, in one exemplary aspect, also substantially arranged in a parallel side-by-side orientation to form an array of moveable members 200. In one aspect, the fixed members 100 and moveable members are interdigitated and collectively form a stack of members in which a moveable member is positioned adjacent each fixed member.

In another aspect, the stack assembly further comprises a linear drive 300 that is operatively connected to each of the moveable members and is configured to cause oscillating movement of each moveable member along a substantially linear path that is substantially parallel to the longitudinal axis of the pin bone removal device. In operation, the oscillating movement causes the moveable members to contact the adjacent fixed member, which subsequently causes pinch points to be created and released between the respective fixed and moveable members 200. As can be appreciated by those skilled in the art, it is contemplated that the fixed members 100 and the moveable members may comprise aluminum, stainless steel, plastic, or any other sufficiently rigid material.

In use, as the fillet of fish is moved along the stack of members, the pin bones are caught at each pinch point and then released. As one skilled in the art will appreciate, the fact that the pinching action occurs across substantially the entire length of the stack of the moveable and fixed members allows for a greater contact surface to grasp the pin bones. Additionally, as opposed to the prior art, the fixed and moveable members do not deform as much, if at all, and, hence, have a lower fatigue rate.

In another aspect, a moveable member is positioned, or interdigitated, between a pair of fixed members to collectively form a portion of the stack of members. In this aspect, the linear drive 300 is configured to cause oscillating movement of each of the moveable members to contact the respective pair of fixed members positioned on either side of each moveable member in an alternating fashion.

In another aspect, the pin bone removal device 10 of the present invention comprises a plurality of substantially parallel elongate drive bars 210 positioned substantially between two endcaps 220. In this aspect, the plurality of fixed members 100 each defines a plurality of primary apertures 110. Each primary aperture is configured to complementarily accept one drive bar 210. Similarly, each of the moveable members 200 defines a plurality of first holes 230 configured to engage the elongate drive bars 210 such that movement of the end caps moves the drive bars in a linear direction parallel to the linear path, which, in turn, moves the array of moveable members in relation to the array of fixed members. Thus, as the endcaps 220 are moved back and forth, the array of moveable members is oscillated or shuttled back and forth on the linear path via the drive bars to cause the desired contact between the respective movable and fixed members.

In still another aspect, the pin bone removal device also comprises a plurality of elongate stationary bars 130 positioned substantially between two fixed stops 140 and parallel to the drive bars 210. In one aspect, the fixed stops 140 are positioned therebetween the endcaps. Each of the fixed members defines a plurality of secondary apertures 120 that are configured to engage the stationary bars 130. Additionally, in this aspect, each of the moveable members defines a plurality of second holes 240 for guiding the moveable members relative to the stationary bars, such that, as the moveable members 200 oscillate, they move along the stationary bars 130 (which pass through the respective second holes 240) in relation to the fixed members 100. Thus, the moveable members move along a substantially linear path that is parallel to the stationary bars 130. In yet another aspect, the outer peripheral edges of the respective fixed members and the moveable members extends radially past the drive bars and stationary bars a predetermined distance. In one aspect, the predetermined distance is spaced a sufficient distance to provide a desired grasping area to effectively grasp the pin bone(s).

In one aspect, the fixed member assembly further comprises a plurality of spacer members 160 that are mounted thereon at least one face 170 of the fixed member. The spacer members 160 maintain substantially uniform spacing between each fixed member. In this aspect, each of the moveable members defines a plurality of spacer holes 250 that are configured to allow the passage of the spacer members, which allows each moveable member to move with respect to the spacer members and engage the adjacent fixed member. In one aspect, each spacer member can be concentrically mounted thereon a portion of an elongate stationary bar therebetween adjacent fixed members. One will appreciate that, in this aspect, the spacer hole 250 and the first hole 230 are one in the same.

In another aspect, the shuttle assembly further comprises a plurality of separators 260 that are mounted on at least one face 280 of the moveable member. In this aspect, the separators 260 maintain substantially uniform spacing between the moveable members. Further, each of the fixed members 100 defines a plurality of separator apertures 180 configured to allow for the passage of the respective separators 260 may pass. Similar to the discussion of the spacer members above, the separators enable each moveable member to move with respect to the adjacent fixed member without the separators engaging the fixed member to restrict movement. In one aspect, each separator 260 is mounted thereon a portion of a drive bar therebetween adjacent moveable members 200. In another aspect, each separator 260 is concentrically mounted thereon a portion of an elongate drive bar therebetween adjacent moveable members. As one will appreciate, in this aspect, the separator aperture 180 and the primary aperture 110 are one in the same.

Additionally, in a further aspect, the pin bone removal device comprises a plurality of isolators 190 mounted substantially between each fixed member. In this aspect, each of the moveable members has a central bore 270 sized to overly and slide thereon the isolator 190. In this aspect, the isolator's purpose is two-fold. First, the isolator provides another spacing surface to space and isolate the fixed members. Second, the isolator provides a bearing surface on which the moveable members may slide back and forth between the adjacent fixed members.

In yet another aspect, the stack of the respective arrays of fixed and moveable members is mounted on a rotatable shaft 410. The shaft is positioned longitudinally therethrough the center of the stack of fixed and moveable members. In one aspect, the respective drive and stationary bars are positioned substantially parallel to the longitudinal axis of the rotatable shaft.

In order to affix the fixed members to the shaft, the stops 140 are mounted thereon a portion of the shaft. In one aspect, set screws are used to mount the stops to the shaft, although any conventional fastener will suffice. Additionally, in one aspect, the shaft is provided with a raised key portion (not shown). In this aspect, the centers of the fixed members 100 are equipped with keyways 420 to engage the raised key portion of the shaft. It is contemplated that fixing the stops onto the shaft would be ample for enabling the fixed members to rotate with the rotatable shaft 410 because the stops 140 are connected to the fixed members via the elongate stationary bars 130. However, providing the key and key way combination further helps to ensure a slipless engagement between the fixed members and the shaft. Additionally, since the moveable members slide thereon the stationary bars 130, they, too, will rotate as the shaft rotates. Where the device 10 is equipped with isolators 190, each isolator may also be equipped with a keyway 420.

As mentioned above, the stops 140 and the fixed members 100 may be fixedly mounted thereon the rotatable shaft. Similarly, in one aspect, the endcaps and the moveable members may be slidably mounted thereon the rotatable shaft. As such, while the fixed members remain fixed in a linear and rotational relationship with the shaft, the endcaps 220 and moveable members 200 are free to slide along the longitudinal direction of the shaft, but remain in a fixed rotational relationship with the shaft.

The pin bone removal device may also comprise a rotation assembly 400 for mounting and rotating the rotatable shaft 410. The rotation assembly 400 comprises a pair of opposed end members 430, each having a mount 440 rotably connected thereto. In one aspect, each end of the rotatable shaft 410 is connected thereto the respective mounts 440. In another aspect, a portion of the rotatable shaft extends through the mount and through the end member. In this aspect, the portion of the shaft that is extending may be operatively connected to a rotation drive 450. The rotation drive may be any conventional drive device configured for rotation of the rotatable shaft 410. Such drive devices include, but are not limited to drive motors connected via gear assemblies, belt assemblies, chain assemblies, and the like.

The rotation of the fixed and moveable members, as the moveable members are oscillating, assists in conveying the fish traveling thereover the pin bone removal device 10. As can be appreciated by one skilled in the art, when the pin bone removal device comprises a rotation assembly, it is beneficial to use disc shaped fixed and moveable members. As such, disc shaped members provide for a substantially uniform or constant surface upon which the fish fillets may travel.

In one aspect, the fixed members are positioned substantially perpendicular to the longitudinal axis. In another aspect, the moveable members are positioned substantially perpendicular to the longitudinal axis. In yet another aspect, the fixed and moveable members may be angled relative to the linear path in order to provide a varying pinch surface. For example, the fixed members may be positioned at a first acute angle $\alpha$ relative to a plane that is perpendicular to the longitudinal axis. As such, the moveable members may be positioned at a second acute angle $\beta$ relative to the plane in a direction substantially opposed to that of the fixed members. In one aspect $\alpha$ and $\beta$, are substantially equal. In another aspect, $\alpha$ and $\beta$ are from about 1 degree to about 30 degrees. In still another aspect, $\alpha$ and $\beta$ are about 3 degrees.

In yet another aspect, the pin bone removal device further comprises a pair of opposing beams 310 slidably mounted thereon the rotatable shaft such that each beam is external to an endcap in a linear sense and extends outwardly away from the rotatable shaft. In one aspect, each beam provides an elongate surface to which the linear drive 300 may be operatively connected. In another exemplary aspect, the linear drive comprises at least one pneumatic member 320 mounted on a support structure 330. In one aspect, the pneumatic member is substantially parallel to the rotatable shaft 410. The pneumatic member 320 engages with each of the beams 310 such that a portion of the pneumatic member is moveable between an extended position and a retracted position. In use, when the pneumatic member 320 is actuated between the extended and retracted positions, the pneumatic member oscillates the beam in a linear fashion along and relative to the rotatable shaft. In turn, the elongate drive bars 210 and moveable members 200 are also oscillated.

Optionally, there may be two pneumatic members, one capable of driving the attached beams in a first direction, and the other capable of driving the attached beams in a second, opposed, direction. Additionally, although the linear drive is described herein as a pneumatic assembly, it may comprise other means of linear translation such as, for example and not meant to be limiting, a cam assembly, a screw drive, or any other conventional drive mechanism.

As one can appreciate, in one aspect the linear drive is independent of the rotational drive. This enables the use of standard diameter discs capable of pulling a wide length of bones. Additionally, the duration of the pinch action and the force applied to the fixed members by the moveable members are infinitely variable. It is however, contemplated that the linear drive can be dependent upon the rotational drive.

It is contemplated that the device of the present invention can also comprise programmable logic control (not shown) to the linear drive, as well as the rotation drive 450. This will allow control of linear speed (duration of moveable member closure and pressure), rotation speed and rotary direction. These settings may be imbedded into an onboard pc card (not shown) based on type of fillet, size of fillet, or even species of fish.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the described invention.

What is claimed is:

1. A pin bone removal device, comprising:
a plurality of fixed members arranged substantially in a parallel side-by-side orientation to form an array of fixed members;
a plurality of moveable members arranged substantially in a parallel side-by-side orientation to form an array of moveable members, wherein the fixed members and the moveable members are interdigitated and collectively form a stack of members in which a moveable member is positioned adjacent each fixed member, and wherein each of the fixed and moveable members comprises a center and wherein the centers of the members in the stack of members are substantially linearly aligned comprising a longitudinal axis extending through the centers of each of the fixed and moveable members;
a means for causing oscillating movement of each moveable member along the longitudinal axis to contact an adjacent fixed member, and wherein the movement causes pinch points to be created and released between the fixed and moveable members.

2. The pin bone removal device of claim 1, wherein a moveable member is positioned between each fixed member, and wherein the linear drive is configured to cause oscillating movement of each of the moveable members to contact the fixed members on either side of each moveable member in an alternating fashion.

3. The pin bone removal device of claim 1, further comprising a pair of endcaps positioned substantially adjacent to respective ends of the stack of members.

4. The pin bone removal device of claim 3, further comprising a plurality of substantially parallel drive bars positioned substantially between and substantially normal to the pair of endcaps.

5. The pin bone removal device of claim 4, wherein the plurality of fixed members each define a plurality of primary apertures, and wherein each primary aperture is configured to complimentarily accept one drive bar.

6. The pin bone removal device of claim 5, wherein each of the moveable members defines a plurality of first holes configured to engage a portion at least one of the elongate drive bars, such that movement of the endcaps moves the drive bars in a linear direction which, in turn, moves the array of moveable members in relation to the array of fixed members.

7. The pin bone removal device of claim 6, further comprising a plurality of elongate stationary bars positioned substantially between two substantially linearly fixed stops and substantially parallel to the drive bars.

8. The pin bone removal device of claim 7, wherein the fixed stops are positioned therebetween the endcaps.

9. The pin bone removal device of claim 8, wherein each of the fixed members define a plurality of secondary apertures configured to engage the respective stationary bars.

10. The pin bone removal device of claim 9, wherein each of the moveable members define a plurality of second holes for guiding the moveable members relative to the stationary bars, whereby as the moveable members move in an oscillating fashion along the stationary bars, the stationary bars pass through the respective second holes.

11. The pin bone removal device of claim 1, wherein the means for causing oscillating movement comprises a linear drive operatively connected to each moveable member.

12. The pin bone removal device of claim 1, further comprising a means for rotating the stack of members about the longitudinal axis.

13. The pin bone removal device of claim 12, wherein the means for rotating comprises a rotational drive operatively connected to at least a portion of each of the fixed members.

14. The pin bone removal device of claim 1, wherein the fixed and moveable members are substantially disc shaped.

15. The pin bone removal device of claim 14, wherein the fixed members are positioned substantially perpendicular to the longitudinal axis.

16. The pin bone removal device of claim 15, wherein the moveable members are positioned substantially perpendicular to the longitudinal axis.

17. The pin bone removal device of claim 14, wherein the fixed members are positioned at a first acute angle relative to a plane that is perpendicular to the longitudinal axis.

18. The pin bone removal device of claim 17, wherein the moveable members are positioned at a second acute angle relative to the plane in a direction substantially opposed to that of the fixed members.

19. The pin bone removal device of claim 18, wherein the first acute angle and the second acute angle are substantially equal.

20. The pin bone removal device of claim 19, wherein the first and second acute angles are from about 0 degree to about 30 degrees.

21. The pin bone removal device of claim 19, wherein the first and second acute angles are about 3 degrees.

* * * * *